June 18, 1940.  A. T. POTTER  2,204,769

WINDSHIELD FRAME

Filed Oct. 10, 1938

INVENTOR
Albert T. Potter.
BY Harness, Dickey & Pierce.
ATTORNEYS.

Patented June 18, 1940

2,204,769

UNITED STATES PATENT OFFICE 2,204,769

WINDSHIELD FRAME

Albert T. Potter, Detroit, Mich., assignor to Ainsworth Manufacturing Company, Detroit, Mich., a corporation of Michigan Application October 10, 1938, Serial No. 234,085

5 Claims. (Cl. 296—84)

The invention relates to motor vehicles and it has particular relation to windshields for such vehicles.

One object of the invention is to provide an ornamental molding for windshield frames constructed of rubber which is adapted to substantially conceal the forwardly exposed side of the rubber frame and at the same time enhance the appearance of the vehicle body.

Another object of the invention is to provide, in connection with moldings such as mentioned, an improved means for attaching the molding to the rubber frame, which will insure retention of the molding in proper position at all times.

Another object of the invention is to provide molding such as mentioned, which permits application of the molding after the windshield has been placed in the opening provided therefor in the vehicle body.

Another object of the invention is to provide molding of his character which assists in preserving the shape of the rubber frame, at least at the forward side of the sheld, and at the same time provides further assurance against leakage of water around the edge of the windshield and into the interior of the vehicle.

Other objects of the invention will become apparent from the following specification, from the drawing to which it relates, and from the claims hereinafter set forth.

For a better understanding of the invention, reference may be had to the drawing wherein.

Figure 1:
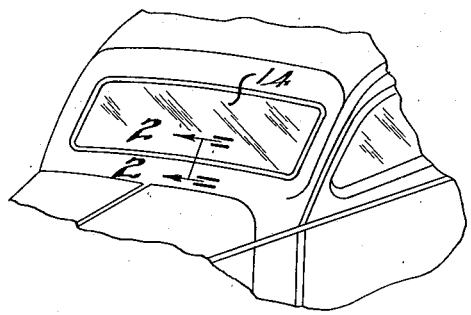
Figure 1 is a fragmentary view of a motor vehicle having a windshield assembly embodying one form of the present invention.
Figure 2:
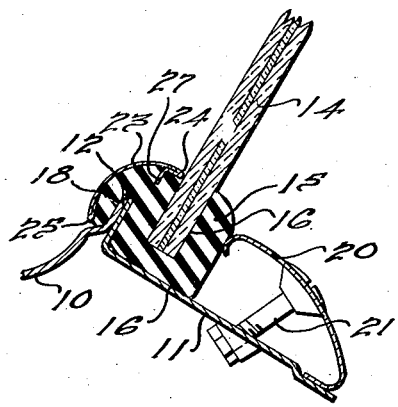
Fig. 2 is a cross-sectional view on a larger scale taken substantially along the line 2—2 of Fig. 1.

Referring to Figs. 1 and 2, the vehicle body is illustrated as having a cowl portion 10 and a panel 11, which are joined at their edges to provide a flange 12 that projects in a generally vertical direction. The panel 11 defines a windshield opening and the flange 12 provides a shoulder at the forward side of the opening that serves as a locating means for the windshield frame to be inserted therein. A windshield is indicated at 14 and the edge of the shield is mounted in a rubber strip 15 that has a channel 16 fitting a substantial edge portion of the glass. The base portion of the strip engages the panel 11, as indicated at 16, and forwardly of the front leg of the channel, the strip has a lip portion 18 which, in conjunction with the forward channel leg, provides a channel for receiving the flange 12. This latter channel resiliently engages the flange 12 so as to normally prevent leakage of water at this point, while the remainder of the strip is held in place by a fastening strip 20 secured to the panel 11 by means of screws 21.

The forwardly exposed side of the rubber strip, including the lip portion 18, is covered by a strip of metal molding 23, preferably constructed of thin stainless steel, and this strip of molding has is edges folded back as indicated at 24 and 25, so as to thereby avoid sharp and unsightly edges. The folded back edge 24 terminates in a sharp and outwardly projecting flange 27, which extends into a narrow recess or slot in the outer leg of the channel 16 and this engagement of flange and slot serves to retain the molding in position. It will be understood, of course, that this flange and slot extend longitudinally of the molding and that the latter, as well as the flange and slot, extend around the periphery of the shield. It is apparent that the molding may be applied after the shield is in place by pressing the flange 27 into the slot and it will be understood that the molding is made in suitable sections so as to permit outward movement of each section to cause movement of the flange 27 into the slot. Preferably the molding is shaped to cause a resilient pressure against the rubber at the edges of the molding and this is helpful in preventing leakage. In other words, the folded edge 25 assists in holding the rubber lip against the flange 12, while the folded edge 24 assists in pressing the rubber against the glass at the points where water would have to enter in order to cause leakage.

Figure 3:
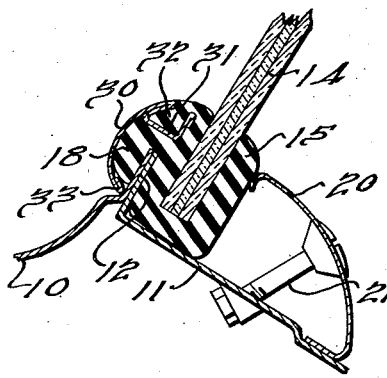
Fig. 3 is a view similar to Fig. 2 illustrating another form of the invention.

In the construction shown by Fig. 3, a strip of molding 30 is employed which at its edge next to the glass is provided with a channel formation 31 having a restricted entry opening. The rubber strip is separated along a line corresponding to the shape of the channel 31, thereby providing a projection 32 adapted to fit within the channel. This projection is pressed into the channel and once in place is held rather strongly therein against removal. At its outer edge, indicated at 33, the molding has a folded back portion which engages the edge of the lip 18 and assists in holding such edge of the lip against the flange 12. It is apparent that the molding may be applied by separating the projecting portion 32 of the rubber from the lip portion 18, then placing the molding in position or approximately in its proper position, and then pressing the projection into the channel 31. It may be added that usually rubber is pressed into a channel having a restricted opening by means of a suitable hammering device adapted to strike rather forceful blows which force the rubber through the restricted entry opening of such channel. As in the construction shown by Fig. 2, the molding is made in suitable sections, although in this case an annular molding could be employed since outward movement is not required.

Figure 4:
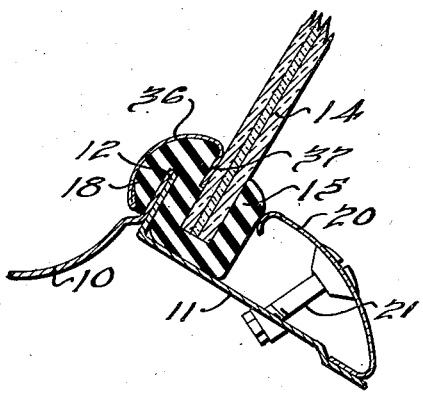
Figs. 4 and 5 are also views similar to Fig. 2, illustrating other forms of the invention.

In the construction shown by Fig. 4, a strip of molding 36 is employed which cooperates with the lip 18 in a manner similar to that already explained, but in this case the molding has a flange at its inner edge, indicated at 37, that projects outwardly between the rubber and the front surface of the glass 14. This molding is made in suitable sections which permits its assembly with the rubber substantially in the manner described with respect to Fig. 2.

Figure 5:
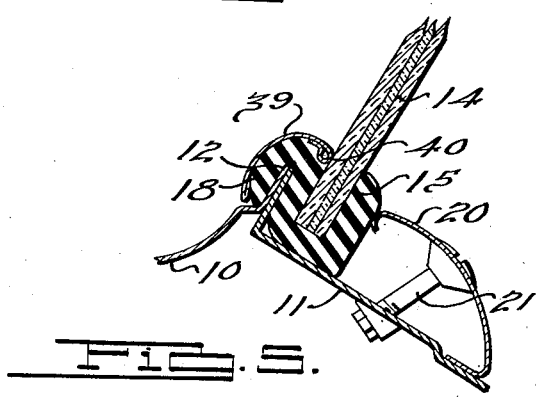

In the construction shown by Fig. 5, molding 39 is employed, which is generally similar to that shown by Fig. 4, excepting that the inner edge of the molding has a turned bead 40 that rests in a recess in the rubber adjacent the front surface of the glass. This molding is applied in a manner similar to that shown by Figs. 2 and 4.

In all of the constructions illustrated, the molding is held positively in place against looseness and cannot be removed except by forceful manipulation. Moreover the edges of the molding hold the rubber against the metal and glass and in conjunction with the resiliency of the rubber, provide further assurances against leakage of water through the windshield. Aside from the fact that the molding provides a pleasing ornamental appearance around the edge of the windshield at its front side, such molding prevents displacement of the rubber such as oftentimes occurs either due to natural deformation of the rubber or due to persons toying with the rubber lip, gradually causing it to remain separated from the flange 12. It will be appreciated that ordinarily, exposed rubber lips provide a temptation, at least to certain persons, to manually maneuver the lip merely to determine how it is associated with the windshield and vehicle body. Repeated manual movements of the lip portion 18 frequently will cause it to remain separated at points at least from the flange 12 and this not only promotes leakiness but also impairs the appearance. Manifestly, the molding preserves the appearance at the front side of the windshield and furthermore assists in preventing leaks.

While the construction has been illustrated and described in connection with windshields at the forward side of the vehicle, it should be apparent that the arrangement may be used in connection with other window openings, such as the rear window of the vehicle, in which event the molding would be located at the rear side of the glass. Accordingly, where the terms in the claims refer to the windshield and to the molding being at the forward side, it is to be understood that such claims would be equally applicable in other locations of a glass, such as in connection with the rear glass of the vehicle.

Although more than one form of the invention has been illustrated and described in detail, it will be apparent to those skilled in the art that various modifications may be made without departing from the scope of the appended claims.

What is claimed is:

1. In combination, a vehicle body having a windshield opening and an inwardly directed flange at the forward edge of the opening, a windshield, a rubber strip extending around the edge of the windshield and having a channel for receiving the edge of the latter with the forward side of the strip abutting the rear side of said flange, a lip portion projecting forwardly from the forward leg of the channel to the front side of the flange, a thin metal molding strip covering the forwardly exposed surface of the lip portion, and means attaching the molding to such lip portion and including a flange on the molding and a slot in the lip portion into which such flange projects, said molding, rubber, and flange being so constructed and arranged that the molding may be applied after the windshield is in place.

2. In combination, a vehicle body having a windshield opening and an inwardly directed flange at the forward edge of the opening, a windshield, a rubber strip extending around the edge of the windshield and having a channel for receiving the edge of the latter with the forward side of the strip abutting the rear side of said flange, a lip portion projecting forwardly from the forward leg of the channel to the front side of the flange, a thin metal molding covering the forwardly exposed surface of the lip portion and extending substantially to the front surface of the shield, and a flange on the molding adjacent the glass and which projects into a recess in the rubber strip for holding the molding in place, said molding, rubber, and flange being so constructed and arranged that the molding may be applied after the windshield is in place.

3. In combination, a vehicle body having a windshield opening and an inwardly directed flange at the forward edge of the opening, a windshield, a rubber strip extending around the edge of the windshield and having a channel for receiving the edge of the latter with the forward side of the strip abutting the rear side of said flange, a lip portion projecting forwardly from the forward leg of the channel to the front side of the flange, a thin metal molding covering the forwardly exposed surface of the lip portion and extending substantially to the front surface of the shield, and a projection along the edge of the molding which extends outwardly between the front surface of the shield and the rubber at the forward side of the shield, said molding, rubber, and flange being so constructed and arranged that the molding may be applied after the windshield is in place.

4. In combination, a vehicle body having a windshield opening, a windshield in said opening, a rubber strip extending around the edge of the shield and having a channel for receiving the latter, and a thin metal molding strip at the forward side of the shield and having a projection along its edge which extends into a recess in the rubber for holding the molding in place, said recess and projection extending substantially parallel to the windshield so that the molding may be applied by movement parallel to the windshield.

5. In combination, a vehicle body having an opening and an inwardly directed flange at one edge of the opening, a glass for the opening, a rubber strip extending around the edge of the glass and having an inwardly open channel for receiving the edge of the glass with one leg of the channel abutting one side of the flange, a lip portion projecting from said one leg and to the opposite side of the flange so that the channel and lip are located at opposite sides of the flange, a thin molding strip on the lip in covering relation to its exposed surface with the outer edge portion of the molding holding the outer edge portion of the lip against the body flange so as to prevent water entering between the lip and flange, and means on the inner edge portion of the molding and disposed in a recess in the rubber for holding the molding in place and the outer edge portion of the molding against the lip.

ALBERT T. POTTER.